United States Patent
Copty et al.

(10) Patent No.: US 8,117,499 B2
(45) Date of Patent: Feb. 14, 2012

(54) GENERATION OF A STIMULI BASED ON A TEST TEMPLATE

(75) Inventors: Shady Copty, Haifa (IL); Alex Goryachev, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 12/485,053

(22) Filed: Jun. 16, 2009

(65) Prior Publication Data

US 2010/0318850 A1    Dec. 16, 2010

(51) Int. Cl.
*G06F 11/00* (2006.01)
*G06F 11/36* (2006.01)

(52) U.S. Cl. ............. 714/37; 714/33; 717/124; 717/126

(58) Field of Classification Search .................... 714/33, 714/37; 717/124–127
See application file for complete search history.

(56) References Cited

U.S. PATENT DOCUMENTS

| | | | | |
|---|---|---|---|---|
| 5,754,755 | A * | 5/1998 | Smith, Jr. | 714/38.1 |
| 5,956,478 | A | 9/1999 | Huggins | |
| 7,434,101 | B2 * | 10/2008 | Adir et al. | 714/33 |
| 7,823,101 | B2 * | 10/2010 | Sugihara | 716/136 |
| 2003/0204388 | A1 | 10/2003 | Rodriguez et al. | |
| 2006/0218513 | A1 * | 9/2006 | Dozorets et al. | 716/5 |
| 2009/0019262 | A1 * | 1/2009 | Tashiro et al. | 712/208 |

* cited by examiner

*Primary Examiner* — Joseph Schell
(74) *Attorney, Agent, or Firm* — Ziv Glazberg (57) ABSTRACT

A test template comprising a repetitive block instruction is translated to a stimuli to be used by a target computerized system or a simulator of such a system. The translation comprises reusing translated portion of the repetitive block instruction in order to reduce translation time and to hasten testing phase of the target computerized system. Reuse may be affected by subcomponents of the target computerized system, a predetermined minimal or maximal number of instructions to reuse, and a heuristic determination to increase possibility of discovering a bug using the stimuli.

26 Claims, 3 Drawing Sheets

GENERATION OF A STIMULI BASED ON A TEST TEMPLATE

BACKGROUND

The present disclosure relates to testing of computerized systems, in general, and to simulation based verification of computerized systems, in particular.

Computerized devices control almost every aspect of modern life. However, computerized devices are bug-prone, and thus require a testing phase in which the bugs should be discovered. The testing phase is considered one of the most difficult tasks in designing a computerized device. The cost of a bug may be enormous, as its consequences may be disastrous. For example, an undetected computerized bug may cause the injury of a person relying on the designated behavior of the computerized device. Additionally, such a bug in hardware or firmware may be expensive to fix, as patching such a bug requires call-back of the computerized device. Therefore, many developers of computerized devices invest a large portion, such as 70%, of the development cycle to discover erroneous behaviors of the computerized device.

Some of the testing is performed using stimulis. A stimuli, also referred to as a testing scenario, may comprise a set of instructions to a target computerized system. The stimuli may further comprise a set of initializiation commands to initialize the target computerized system. The stimuli may further comprise a definition of an environment interacting with the target computerized system (also referred to as behavioral commands), such as for example user input, content of data transferred by third-party devices, interrupt raised and the like. The definition of the environment properties stimulate a target computerized system being tested to perform in one manner or another. In some exemplary testing scenarios an order of parallel execution of portions of the target computerized system is defined strictly by the stimuli while in other testing scenarios parallel execution is not defined by the testing scenarios at all.

Testing scenarios are most commonly used in hardware system. In some testing environments the testing scenarios are executed by a simulator of the target computerized system rather than by the target computerized system itself. In some cases, the simulator is an emulator or an accelerator which decreases running time of the stimuli in respect to standard simulators. In other testing environments, the testing scenarios are executed by the target computerized system itself.

Testing scenarios may be generated by a user such as a quality assurance professional or a developer. Testing scenarios may be generated by a computerized generator based on a test template. The test template is a definition of a template that corresponds to a set of testing scenarios. The computerized generator generates a testing scenario based on the test template.

Some exemplary computerized generators randomly generate the testing scenario based on the test template. Other exemplary computerized generators generate the testing scenario in a pseudo-random manner, by biasing the generated testing scenario to hold certain properties, such as repeatedly accessing a memory location, filling a buffer, memory access associated with two memory pages (also referred to as page cross) and the like.

BRIEF SUMMARY OF THE INVENTION

One exemplary embodiment of the disclosed subject matter is a computerized apparatus comprising: a processor; a testing scenario generator configured to generate an at least one testing scenario associated with a test template; the test template defining a set of one or more testing scenarios for a target computerized system; the test template comprises an at least one repetitive block comprising: a template counter; and a template instruction; the template counter defines a predetermined range of times to interpret the template instruction into a target instruction; the testing scenario generator comprising: a template instruction interpreter configured to determine an at least one target instruction associated with a template instruction; a repetitive block interpreter for determining an at least one target instruction associated with the at least one repetitive block; the repetitive block interpreter comprising: a repetitive determination unit for determining whether to reuse a portion of the at least one target instruction determined by the template instruction interpreter.

Another exemplary embodiment of the disclosed subject matter is a method comprising: generating an at least one testing scenario associated with a test template; the test template defining a set of one or more testing scenarios for a target computerized system; the test template comprises an at least one repetitive block comprising: a template counter; and a template instruction; the template counter defines a predetermined range of times to interpret the template instruction into a target instruction; the generating the at least one testing scenario comprises: determining an at least one target instruction associated with the template instruction; determining an at least one target instruction associated with the at least one repetitive block; the determining an at least one target instruction comprises: determining whether to reuse a portion of the at least one target instruction; and reusing the portion of the at least one target instruction; a processor is utilized for performing the generating the at least one testing scenario; whereby the at least one testing scenario is generated in a computer-readable medium.

Yet another exemplary embodiment of the disclosed subject matter is a computer program product comprising: a computer readable medium; first program instruction for generating an at least one testing scenario associated with a test template defining a set of one or more testing scenarios for a target computerized system; the test template comprises an at least one repetitive block comprising: a template counter; and a template instruction; the template counter defines a predetermined range of times to interpret the template instruction into a target instruction; the first program instruction comprises: second program instruction for determining an at least one target instruction associated with the template instruction; third program instruction for determining an at least one target instruction associated with the at least one repetitive block; the third program instruction comprises: fourth program instruction for determining whether to reuse a portion of the at least one target instruction; and fifth program instruction for reusing the portion of the at least one target instruction; wherein the first, second third, fourth and fifth program instructions are stored on the computer readable media.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to decrease time required for a testing phase of a target computerized system. Another technical problem dealt by the disclosed subject matter is to decrease generation time of a testing scenario based on a test template while still provided a testing scenario of a relatively high quality.

One technical solution is to reuse a portion of a target instruction generated by a generator corresponding to a portion of a test template. Another technical solution is to use a looping instruction in the testing scenario to achieve repetition of a portion of the generated testing scenario. Yet another technical solution is to provide a lower bound of number of target instructions that are reused by the looping instruction.

One technical effect of utilizing the disclosed subject matter is generating a testing scenario of a relatively small number of instructions and relatively high number of instruction to be performed by the target computerized system or simulator. Another technical effect is decreasing the time required by the generator to generate a testing scenario based on the test template.

Figure 1:
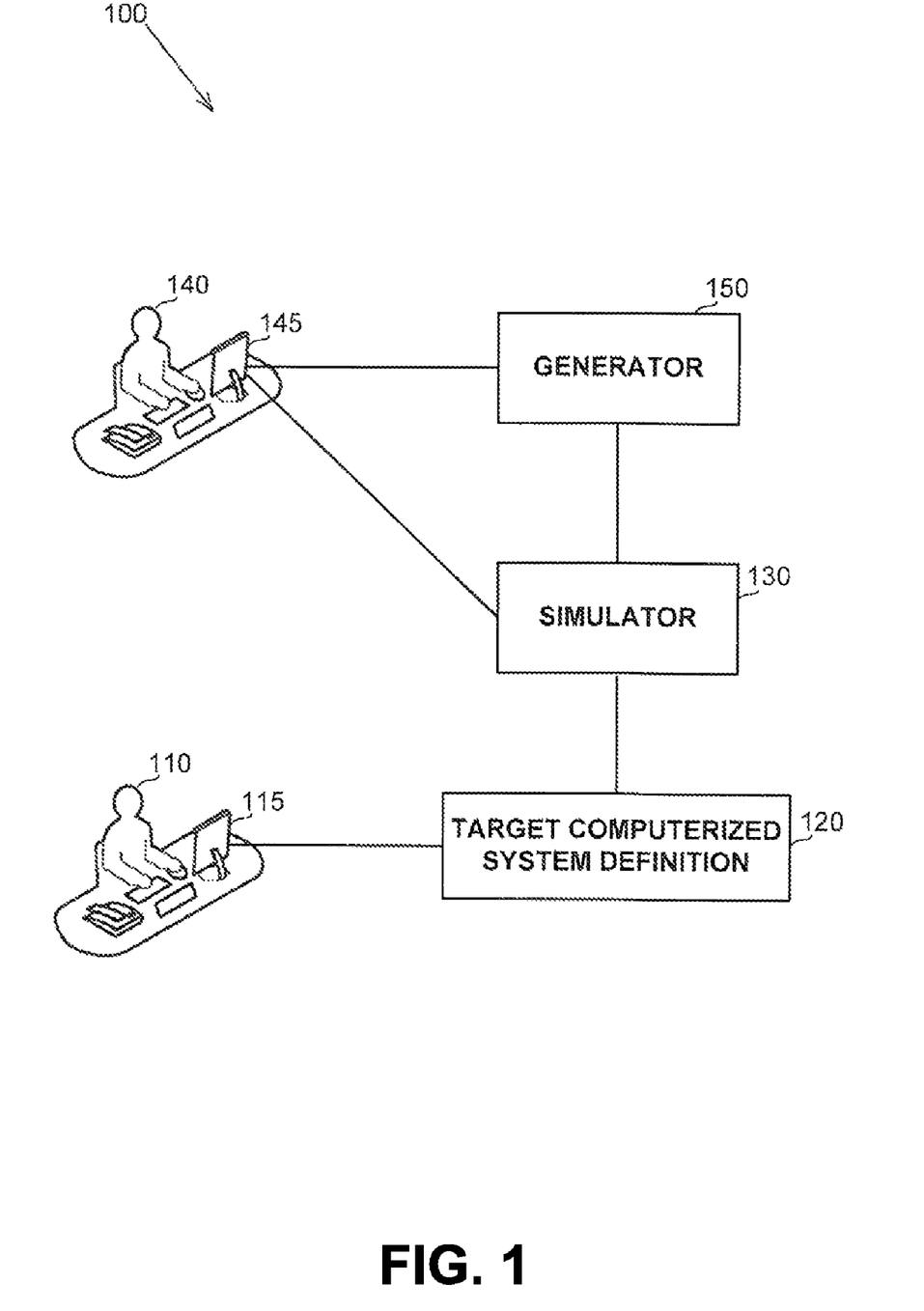
FIG. 1 shows a computerized environment in which the disclosed subject matter is used, in accordance with some exemplary embodiments of the subject matter.

Referring now to FIG. 1 showing a computerized environment in which the disclosed subject matter is used, in accordance with some exemplary embodiments of the subject matter. A computerized environment 100 comprises a simulator 130 and a generator 150. The simulator 130 is configured to execute a testing scenario generated by the generator 150.

In some exemplary embodiments of the disclosed subject matter, a target computerized system definition 120 is defined by a developer 110, such as for example, a designer or a developer of the target computerized system (not shown). The developer 110 may define the target computerized system definition 120 using a terminal 115, such as a personal computer, a personal digital assistant, a laptop computer and the like. In some exemplary embodiments the target computerized system definition 120 is defined using a descriptive language which defines a behavior of the target computerized system. Some exemplary non-limiting descriptive languages are VHDL, SystemC, Verilog, Java, ADA and the like.

Based upon the target computerized system definition 120 a simulator 130 may be determined. The simulator 130 may be a hardware simulator, a hardware emulator, a hardware accelerator, a software simulator and the like. It will be noted that the simulator 130 is a computerized system corresponding to the target computerized system and having substantially an equivalent behavior. In some exemplary embodiments, the simulator 130 is a general purpose simulator which is configured to have an equivalent behavior to the behavior of the target computerized system. For example, the general purpose simulator may receive as an input a modeling of the behavior of the target computerized system. The simulator 130 of a software target computerized system may be the software target computerized system itself, a version of the software target computerized system compiled using debug flags and the like. The simulator 130 may be generated automatically based on the target computerized system definition 120, developed manually by a developer (not shown) such as developer 110 or a combination thereof and the like.

As disclosed above, the computerized environment 100 comprises a generator 150 for generating testing scenarios to be executed by the simulator 130. The generator 150 is configured to generate an at least one testing scenario based on a test template (not shown). In some exemplary embodiments, a user 140, such as for example a verification engineer, a quality assurance personnel or the like, utilizes a terminal 145 to define the test template and to provide the generator 150 with the test template. It will be noted that in some exemplary embodiments, the user 140 and the developer 110 are a single person. In some exemplary embodiments, both the terminal 145 and the terminal 115 are a single computerized device.

In some exemplary embodiments of the disclosed subject matter, an outcome (not shown) of an execution of the test scenario is transferred to the terminal 145. The user 140 may inspect the execution to determine a quality measurement of the target computerized system, such as whether or not a bug exists, whether the target computerized system operates in accordance with a specification and the like. It will be noted that as the simulator 130 may be determined based on the target computerized system definition 120 any errors in the target computerized system definition may affect the quality measurement. For example, a bug may occur only due to an error in the target computerized system definition 120. In an alternative example, an error in the target computerized system definition 120 conceals a bug of the target computerized system.

It will be further noted that in some exemplary embodiments of the disclosed subject matter, the target computerized system definition 120 is utilized to generate the target computerized system. For example, in hardware domain, a VHDL model may be the target computerized system definition 120 and may be used to produce the target computerized system later on. The usage of a simulator 130 may be in order to reduce testing costs, by producing a hardware device only after the testing phase is completed and not producing several different versions for testing. The usage of a simulator 130 may be in order to reduce time-to-market as producing a hardware device may take a long while.

In some exemplary embodiments, execution time of the simulator 130 is longer than that of the target computerized system. In addition, there may be a overhead for loading a testing scenario to the simulator 130. Therefore, it may be prudent to generate long test scenarios so that relatively to the execution time, the overhead is less significant. In some exemplary embodiments, the simulator 130 executes the testing scenario relatively fast, and the bottleneck of the testing phase is in the generation time of the testing scenario by the generator 150. This may be especially true when the testing scenario is long and may require complex computations to be generated. A long testing scenario is a testing scenario that comprises many instructions for the target computerized system, referred to as target instructions. Therefore, one aspect of the disclosed subject matter is to reduce generation time of the generator 150.

Figure 2:
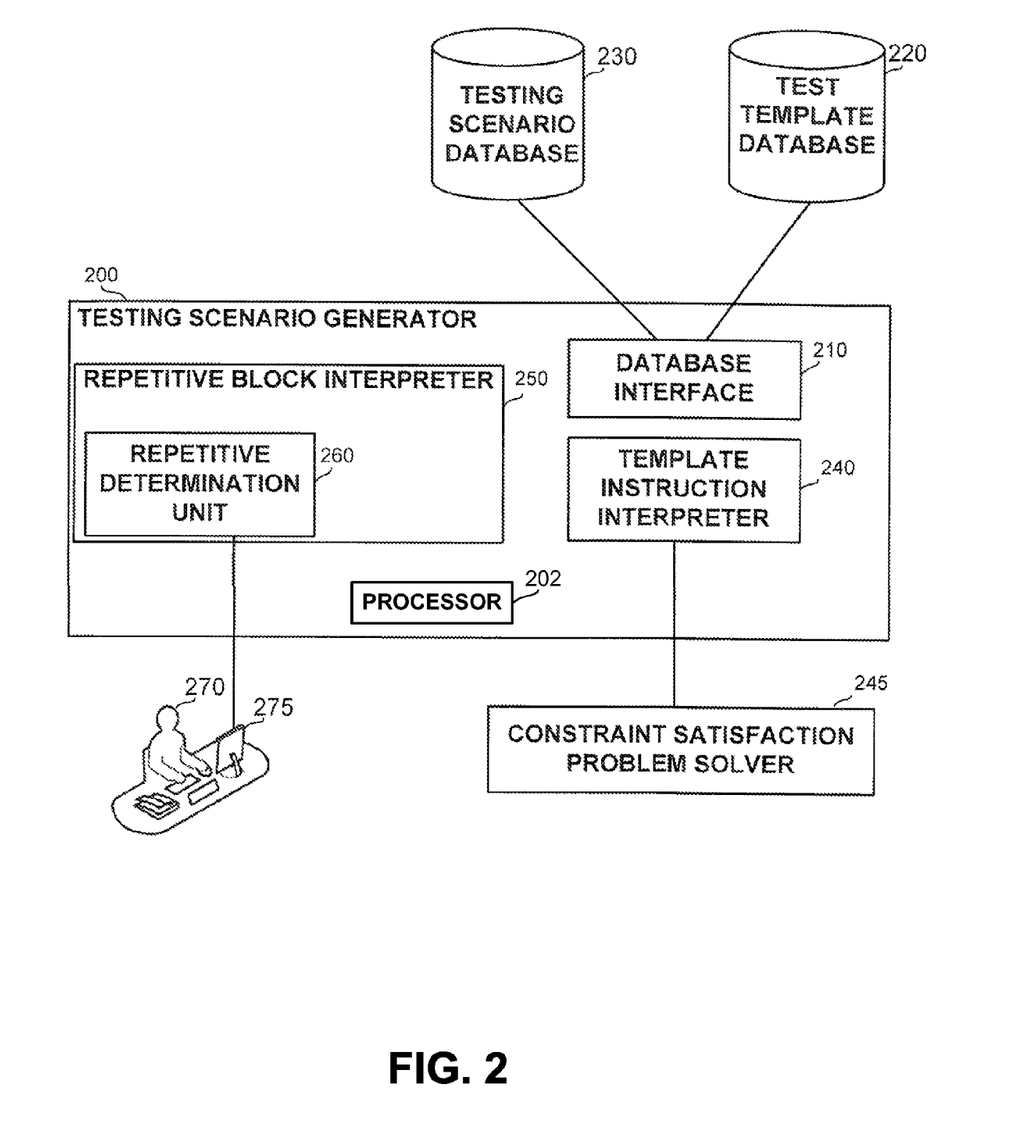
FIG. 2 shows a block diagram of a testing scenario generator in accordance with some exemplary embodiments of the disclosed subject matter.

Referring now to FIG. 2 showing a block diagram of a testing scenario generator in accordance with some exemplary embodiments of the disclosed subject matter. A testing scenario generator 200 in accordance with some exemplary embodiments of the disclosed subject matter comprises a database interface 210, a template instruction interpreter 240 and a repetitive block interpreter 250.

The database interface 210 may enable the testing scenario generator 200 to access a database, such as a test template database 220 or a testing scenario database 230. The database interface 210 may be utilized to retrieve a test template (not shown) from a test template database 220. Based upon the test template the testing scenario generator 200 may generate a testing scenario. In some exemplary embodiments, the test template database 220 is a benchmark of test templates in accordance with the target computerized system. In other exemplary embodiments, the test template database 220 comprises one or more test templates created by a user, such as user 140 of FIG. 1. The database interface 210 may be utilized to store a generated testing scenario in the testing scenario database 230. In some exemplary embodiments, the testing scenario database 230 and/or the test template database 220 are a storage device, such as a hard-disk, a Flash memory, a Compact Disc or the like. In other exemplary embodiments, the testing scenario database 230 and/or the test template database 220 are a computerized database. In some exemplary embodiments, the testing scenario database 230 and the test template database 220 may be a single database or two separate databases.

In some exemplary embodiments, the template instruction interpreter 240 determines one or more target instructions based on a template instruction. The one or more target instructions are also referred to as an interpretation of the template instruction. The template instruction may be translated into a Constraint Satisfaction Problem (CSP) by the template instruction interpreter 240 or provided as such to the testing scenario generator 200. The template instruction interpreter 240 may utilizes a CSP Solver 245 to determine the one or more target instructions. An exemplary template instruction is "P write to Address X", where P is a processor, X is an effective address. The template instruction interpreter 240 may determine which process performs the write command, to which effective address that data is written, to which real address that data is written, a size of the data being written (e.g., a byte, a word, 2-bit, 3-byte and the like), a content of the data being written and the like. Another exemplary template instruction is "One of: CPU access memory or CPU interrupt". The template instruction interpreter 240 may determine whether to perform a CPU access memory command or a CPU interrupt command, which specific type of command (e.g., a write command, a read command, interrupt command) and associated parameters such as a CPU, an interrupt kind, an effective and real address and the like.

The template instruction interpreter 240 may determine a CSP based upon the template instruction comprising one or more constraints, also referred to as hard constraints. The CSP may further comprise one or more soft constraints. A CSP Solver 245 provides an assignment of each variable defined by the CSP such that every constraint is held by the assignment. The CSP Solver 245 may determine the assignment such that it maximizes or increases the number of soft constraints that are also held. In some exemplary embodiments, the CSP solver 245 heuristically tries to determine the assignment such that it holds as many soft constraints as possible. In other exemplary embodiments, the CSP solver 245 first tries solving a CSP comprising all soft constraints as hard constraints and iteratively determines a soft constraint to be removed until a satisfying assignment is determined. It will be further noted that different algorithms may be used to bias the assignment such that it has predetermined parameters, characterizations, behaviors and the like.

In some exemplary embodiment, the repetitive block interpreter 250 determines a one or more target instructions corresponding to a repetitive block in the test template. The repetitive block may comprise a repetitive counter and one or more template instructions. The repetitive counter may determine a number of times the one or more template instructions should be interpreted to target instructions. For example, a repetitive block may be: "Repeat 1000: One of: CPU access memory or CPU interrupt". The repetitive counter of the exemplary repetitive block is one thousand determining that the template instruction "One of: CPU access memory or CPU interrupt" is to be interpreted a thousand times. In some exemplary embodiments, the repetitive block interpreter 250 may utilize the template instruction interpreter 240 a thousand times. In other exemplary embodiments, the repetitive block interpreter 250 may utilize the template instruction interpreter 240 a number of times lower than a thousand, such as for example about five hundred times, and reuse the target instructions determined by the template instruction interpreter 240. In some exemplary embodiments, the repetitive counter may determine a range of number of times the one or more template instructions should be interpreted, such as between 500 and 1500 times.

Referring again to the aforementioned exemplary repetitive block, the repetitive block interpreter 250 may initially utilize the template instruction interpreter 240 to determine a number of interpretations of the template instruction "One of: CPU access memory or CPU interrupt" lower than a thousand, such as for example about one hundred interpretations. In some exemplary embodiments, the about one hundred interpretations may be unique while in other exemplary embodiments, a portion of the interpretations may be the same. The repetitive block interpreter 250 may determine to reuse the about one hundred interpretations several times, such as for example seven times, providing about seven hundred interpretations out of the required thousand interpretations. The repetitive block interpreter 250 may provide the remaining about three hundred interpretations either by utilizing the template instruction interpreter 240 about three hundred more times or by utilizing the template instruction interpreter 240 less than about three hundred times and reusing the interpretations.

The repetitive block interpreter 250 may reuse one or more interpretations by using a repetitive target instructions, such as a repeat command, a looping command such as a for command, a while command, a goto command, a conditioned jump command or other similar control flow commands. In other exemplary embodiments, the repetitive block interpreter 250 may reuse a one or more interpretations by duplicating the target instructions in the testing scenario. It will be noted that in case the target computerized system comprises several computerized units, such as separate hardware units, the repetitive block interpreter 250 can reuse a set of target instructions referring to a single computerized unit.

In some exemplary embodiments of the disclosed subject matter, the repetitive block interpreter 250 comprises a repetitive determination unit 260. The repetitive determination unit 260 determines a portion of the interpretations to reuse. In some exemplary embodiments, the repetitive determination unit 260 determines to reuse a set of interpretations of a predetermined minimal size, such as fifty interpretations. The predetermined minimal size may be determined based upon parameters, characteristics or rules regarding the test template. In other exemplary embodiments, the minimal size may be determined by a user 270, such as user 140 of FIG. 1, using a terminal 275 such as terminal 145 of FIG. 1. In other exemplary embodiments, the target computerized system comprises several computerized units, the minimal size may differ based on a computerized unit of the target computerized system that the interpretations refer to.

In some exemplary embodiments of the disclosed subject matter, the testing scenario generator 200 further comprises a processor 202. The processor 202 is a Central Processing Unit (CPU), a microprocessor, an electronic circuit, an Integrated Circuit (IC) or the like. The processor 202 may be utilized to perform computations required by the testing scenario generator 200 or any of its subcomponents, such as for example the repetitive block interpreter 250, the repetitive determination unit 260, the template instruction interpreter 240, the database interface 210 or any other subcomponent.

Figure 3:
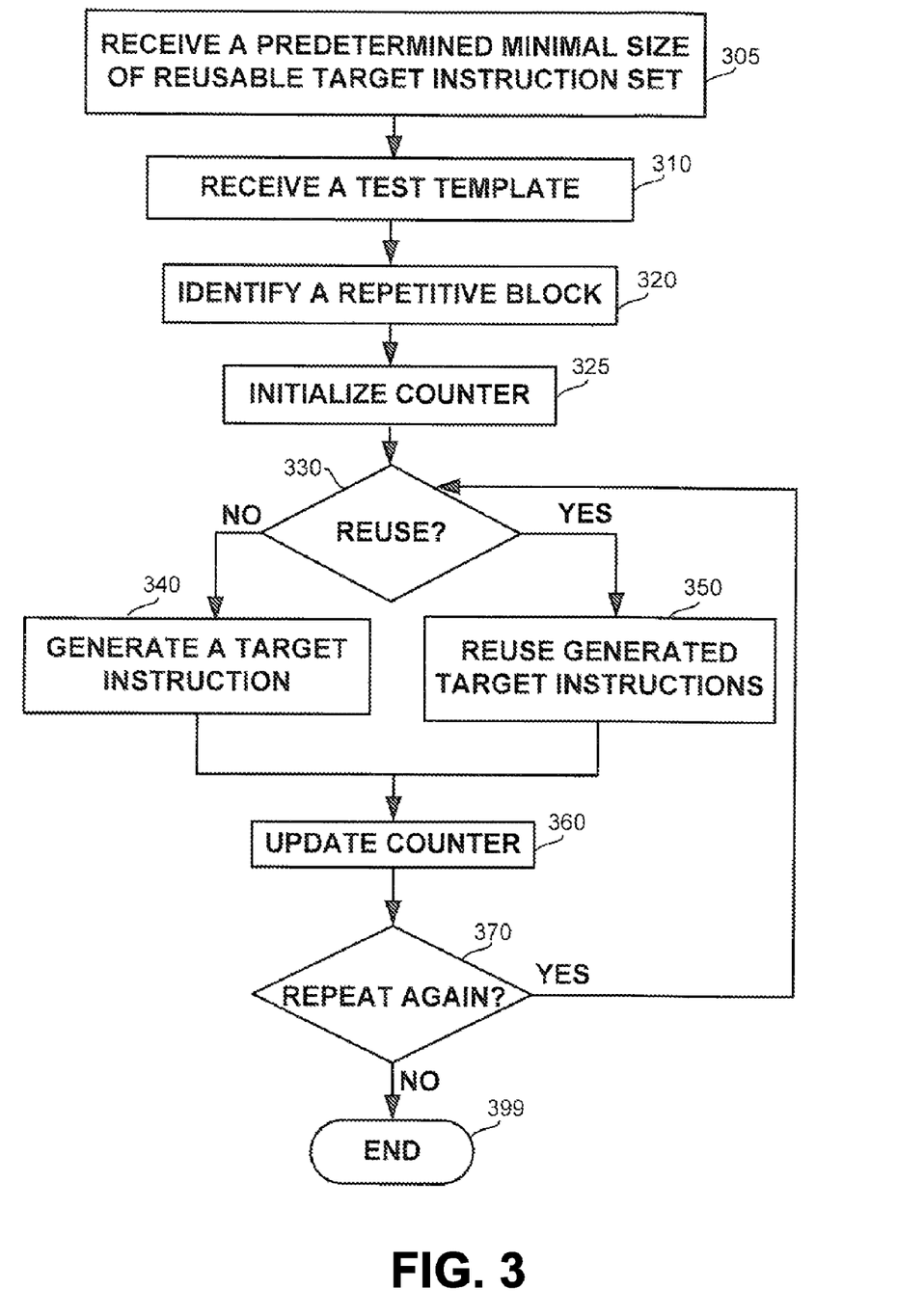
FIG. 3 shows a flowchart diagram of a method in accordance with some exemplary embodiments of the disclosed subject matter.

Referring now to FIG. 3 showing a flowchart diagram of a method in accordance with some exemplary embodiments of the disclosed subject matter.

In step 305 a predetermined minimal size of reusable target instruction set is received by a computerized device, such as a testing scenario generator 200 of FIG. 2. The predetermined minimal size of reusable target instruction set may be received from a configuration file, a user such as user 270 of FIG. 2 and the like. In some exemplary embodiments, the target computerized system comprises several computerized units and several predetermined minimal sizes are received, each referring to one of the several computerized units. In other exemplary embodiments, a single predetermined minimal size is received and it refers to a minimal size of a target instructions set referring to a computerized unit of the target computerized system.

In step 310 a test template is received by a computerized device, such as a testing scenario generator 200 of FIG. 2. The test template may be received from a test template database, such as 220 of FIG. 2, from a verification engineer, a user such as 270 of FIG. 2 and the like. In some exemplary embodiments, an indication regarding a number of testing scenarios to be generated based on the test template is also received.

In step 320, a repetitive block comprising a repetitive counter and at least one template instruction is identified. One or more interpretations of the repetitive block are required to be generated. In steps 325, 330, 340, 350, 360 and 370 the one or more interoperations may be generated as is detailed below.

In step 325 a counter is initialized. In an exemplary embodiment, the counter is initialized to zero. The counter is used to count a number of interpretations for the repetitive block that were generated. In other exemplary embodiments, the counter may be used to determine a remaining number of interpretations to be generated for the repetitive block.

In step 330, a determination is made whether to reuse a portion of interpretations generated for the repetitive block. In case the determination is to reuse step 350 is performed, otherwise, step 340 is performed. The determination may be performed by a repetitive determination unit, such as 260 of FIG. 2. In an exemplary embodiment of the disclosed subject matter, a verification engineer, a user such as 270 of FIG. 2, or the like manually determines reuse. The determination may be biased to reuse a set of a minimal size, a maximal size and a combination thereof. The determination may be fully random, pseudo-random or based on a heuristic such as a minimal level of complexity of a set of interpretations that may be reused. A minimal level of complexity may be based upon a use of a common resource such as a memory address, a buffer, an I/O device and the like. The minimal level of complexity may be based upon other characterizations such as performing page crossing, raising several interrupts, filling a memory buffer, utilizing more than one processor or other subcomponents and the like.

In some exemplary embodiments of the disclosed subject matter, the value of the counter is examined to determine whether sufficient number of interpretations was generated. In other exemplary embodiments, an interpretation that was reused is not reused again. In such an exemplary embodiment, another counter may be used to count a number of interpretations that were generated but not yet reused. In case the number of interpretations that may be reused is within a predetermined range, a heuristic choice is made according to parameters or characteristic of the interpretations and predetermined rules. In an exemplary embodiment, the heuristic choice is aimed to invoke erroneous behavior of the target computerized system. For example, the heuristic is biased towards interpretations that access a shared computerized resource, interpretation that utilize an inter-process communication protocol, interpretations that invoke specific behavior that is predeterminly suspected to be bug-prone, such as realtime behavior, performing page crossing, behavior when a buffer is full and the like.

In an exemplary embodiment of the disclosed subject matter, in case the determination is made in step 330 to reuse the portion, an additional determination is made how many times to reuse that portion. For example, reusing the portion twice may be achieved by adding a loop command with three iterations. The determination of number of reuses may be random, may depend on the value of the counter, the value of the repetitive counter, a predetermined parameter, argument or rule and the like.

In step 340, an at least one target instruction is generated based on the at least one template instruction. In some exemplary embodiments, a template instruction interpreter such as 240 of FIG. 2 may perform said step 340, which may or may not utilize a CSP solver, such as 245 of FIG. 2, for that end. In other exemplary embodiments, a user, such as 270 of FIG. 2, may perform the determination manually.

In step 350, a portion of the generated target instructions is reused, as determined in step 330. The portion may be directed to a single computerized unit, such as a CPU. The portion may or may not be a set of target instructions consecutively generated. The portion may further depend on the value of the counter and the repetitive counter. For example in case a value of the counter is ten and a value of the repetitive counter is twelve, the size of the portion to be reuse cannot be greater than two (i.e., twelve minus ten). In an exemplary embodiment, reusing the portion of the generated target instructions is performed by generating a looping command, such as a for command, a goto command, a branching command, a jump command or the like. In another exemplary embodiment, reusing is performed by duplicating the target instructions.

In step 360 the counter is updated in accordance with the number of interpretations generated. For example, in case step 340 was performed, one interpretation was generated. In case step 350 was performed, the counter is updated by the size of the set of interpretations reused in step 350 multiplied by the number of times the set is reused.

In step 370 a determination is made whether or not to continue interpreting the repetitive block depending on the value of the counter and the value of the repetitive counter. In case the determination is to continue interpreting the repetitive block, step 330 is performed again. Otherwise, step 399 is performed.

In step 399 the method ends. It will be noted that in some exemplary embodiments, a test template comprises of additional repetitive blocks and those are also to be interpreted. For that purpose, the control may loop back to step 320 to interpret the additional repetitive blocks. In other exemplary embodiments, additional steps are performed to generate an interpretation of non repetitive blocks in the test template. In yet other exemplary embodiments of the disclosed subject matter, a test template may comprise several repetitive blocks which may or may not be nested. Interpreting a nested repetitive block is performed in a similar manner while maintaining several counters.

It will be noted that in an exemplary embodiment of the disclosed subject matter, determinations are made during steps 340 and 350 instead of generations and in an additional step all target instructions are generated.

It will be further noted that in some exemplary embodiments, the disclosed subject matter is utilized as a preprocessing step before generating instructions that may be performed by the target computerized system, a simulator and the like. In such exemplary embodiments, the instructions generated by the disclosed subject matter are template instructions that are configured to be translated into target instructions may an additional interpreter. For example, consider the aforementioned exemplary repetitive block "Repeat 1000: One of: CPU access memory or CPU interrupt". An exemplary embodiment may interpret the repetitive block into several repetitive blocks such as for example:

Loop 3: Repeat 100: One of: CPU access memory or CPU interrupt

Loop 5: Repeat 80: One of: CPU access memory or CPU interrupt

Loop 6: Repeat 50: One of: CPU access memory or CPU interrupt

In the aforementioned example, the repetitive block of one thousand instructions is translated into three repetitive blocks. The first consists of one hundred instructions to translate. The one hundred instructions are reused three times, as instructed by the Loop command. The second repetitive block consists of eighty instructions to translate which are reused five times. The third repetitive block consists of fifty instructions to translate which are reused six times. The aforementioned example reduced the number of instructions to translate from one thousand to two hundred and thirty instructions.

It will be noted that in such exemplary embodiment, a CSP solver is not required as the translation of a template instruction to a target instruction is rather straight-forward.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computerized apparatus comprising:
   a processor; and
   a testing scenario generator configured to generate an at least one testing scenario associated with a test template;
      the test template defining a set of one or more testing scenarios for a target computerized system;
      the test template comprises an at least one repetitive block comprising:
         a template counter; and
         a template instruction;
      wherein the template counter defines a predetermined range of times to interpret the template instruction into a target instruction;
      said testing scenario generator comprising:
         a template instruction interpreter configured to determine an at least one target instruction associated with a template instruction; and
         a repetitive block interpreter for determining an at least one target instruction associated with the at least one repetitive block; said repetitive block interpreter comprising
            a repetitive determination unit for determining whether to reuse a portion of the at least one target instruction determined by said template instruction interpreter.

2. The computerized apparatus of claim 1 further comprising an interface for receiving the test template.

3. The computerized apparatus of claim 2, wherein said repetitive block interpreter further comprises an interface to utilize said template instruction interpreter.

4. The computerized apparatus of claim 1, wherein the portion of the at least one target instruction determined by said template instruction interpreter comprises at least a predetermined number of target instructions.

5. The computerized apparatus of claim 1, wherein the template instruction is configured to be translated to a constraint satisfaction problem; and wherein said template instruction interpreter utilizes a constraint satisfaction problem solver.

6. The computerized apparatus of claim 1, wherein the target computerized system is a hardware system.

7. The computerized apparatus of claim 6, wherein the target computerized system comprises a computerized unit; and wherein a portion of all target instructions is associated with the computerized unit.

8. The computerized apparatus of claim 7, wherein said repetitive determination unit is configured to reuse a set of at least a predetermined number of target instructions associated with the computerized unit.

9. The computerized apparatus of claim 7, wherein said repetitive determination unit is configured to loop over a set of at least a predetermined number of target instructions associated with the computerized unit.

10. The computerized apparatus of claim 1, wherein the testing scenario is configured to be executed by a hardware simulator associated with the target computerized system.

11. The computerized apparatus of claim 1, wherein the repetitive determination unit is configured to determine a number of times the template instruction is interpreted to a target instruction.

12. The computerized apparatus of claim 1, wherein the repetitive determination unit is configured to determine a minimal size of interpretation set for interpreting a template instruction.

13. The computerized apparatus of claim 1, wherein the template instruction interpreter is configured to determine the at least one target instruction in accordance with a heuristic choice.

14. A method comprising:
   generating an at least one testing scenario associated with a test template;
      the test template defining a set of one or more testing scenarios for a target computerized system;
      the test template comprises an at least one repetitive block comprising:
         a template counter; and
         a template instruction;
      wherein the template counter defines a predetermined range of times to interpret the template instruction into a target instruction;
      said generating the at least one testing scenario comprises:
         determining an at least one target instruction associated with the template instruction;
         determining an at least one target instruction associated with the at least one repetitive block;

said determining an at least one target instruction comprises: determining whether to reuse a portion of the at least one target instruction; and
reusing the portion of the at least one target instruction; and
utilizing a processor for performing said generating the at least one testing scenario;
whereby the at least one testing scenario is generated in a computer-readable medium.

15. The method of claim 14, wherein said determining an at least one target instruction associated with the at least one repetitive block is performed during preprocessing.

16. The method of claim 14, wherein said reusing the portion of the at least one target instruction is performed for the portion of the at least one target instruction of at least a predetermined number of target instructions.

17. The method of claim 16, further comprising receiving from a user the predetermined number of target instructions.

18. The method of claim 14 further comprising: translating the template instruction into a constraint satisfaction problem; and wherein said determining an at least one target instruction associated with the template instruction comprises solving the constraint satisfaction problem.

19. The method of claim 14, wherein said reusing the portion of the at least one target instruction comprises utilizing a looping instruction.

20. The method of claim 14, wherein:
the target computerized system comprises a computerized unit;
a portion of all target instructions is associated with the computerized unit; and
said reusing the portion of the at least one target instruction comprises reusing a portion of the at least one target instruction comprising at least a predetermined number of target instructions associated with the computerized unit.

21. The method of claim 14, wherein the testing scenario is executed by a hardware simulator associated with the target computerized system.

22. The method of claim 14, wherein
said determining whether to reuse a portion of the at least one target instruction is performed for a first portion and a second portion; and
said reusing the portion of the at least one target instruction is performed for the first portion and for the second portion.

23. The method of claim 14, further comprising determining a number of times the template instruction is interpreted to a target instruction.

24. The method of claim 14, further comprising determining a minimal size of interpretation set for interpreting a template instruction.

25. The method of claim 14, wherein the at least one target instruction is determined in accordance with a heuristic choice.

26. A computer program product comprising:
A non-transitory computer readable medium;
first program instruction for generating an at least one testing scenario associated with a test template defining a set of one or more testing scenarios for a target computerized system;
the test template comprises an at least one repetitive block comprising:
a template counter;
and a template instruction;
wherein the template counter defines a predetermined range of times to interpret the template instruction into a target instruction;
said first program instruction comprises:
second program instruction for determining an at least one target instruction associated with the template instruction; and
third program instruction for determining an at least one target instruction associated with the at least one repetitive block;
said third program instruction comprises:
fourth program instruction for determining whether to reuse a portion of the at least one target instruction; and
fifth program instruction for reusing the portion of the at least one target instruction;
wherein said first, second, third, fourth, and fifth program instructions are stored on said non-transitory computer readable medium.

* * * * *